United States Patent
Grohmann et al.

(10) Patent No.: US 9,643,717 B2
(45) Date of Patent: May 9, 2017

(54) SYSTEM AND A METHOD FOR CONTROLLING PITCHING STABILIZER MEANS OF AN AIRCRAFT

(71) Applicant: AIRBUS HELICOPTERS, Marignane (FR)

(72) Inventors: Boris Grohmann, Munich (DE); Thomas Buro, Marseilles (FR)

(73) Assignee: Airbus Helicopters, Marignane (FR)

( * ) Notice: Subject to any disclaimer, the term of this patent is extended or adjusted under 35 U.S.C. 154(b) by 322 days.

(21) Appl. No.: 14/267,158

(22) Filed: May 1, 2014

(65) Prior Publication Data

US 2014/0326825 A1 Nov. 6, 2014

(30) Foreign Application Priority Data

May 3, 2013 (FR) ...................... 13 01034

(51) Int. Cl.
*B64C 13/00* (2006.01)
*B64C 13/50* (2006.01)
*F16H 3/72* (2006.01)
*B64C 13/42* (2006.01)
*B64C 27/82* (2006.01)

(52) U.S. Cl.
CPC .............. *B64C 13/50* (2013.01); *B64C 13/42* (2013.01); *B64C 13/503* (2013.01); *F16H 3/724* (2013.01); *B64C 2027/8281* (2013.01)

(58) Field of Classification Search
CPC ......... B64C 13/00; B64C 13/42; B64C 13/50; B64C 13/503; B64C 13/16
USPC .................................................... 244/17.13
See application file for complete search history.

(56) References Cited

U.S. PATENT DOCUMENTS

| 2,424,882 A | 7/1947 | Gluhareff |
| 4,304,375 A * | 12/1981 | Builta ..................... B64C 13/16 |
| | | 244/17.13 |
| 4,765,568 A | 8/1988 | Carl et al. |

(Continued)

FOREIGN PATENT DOCUMENTS

| FR | 2456663 | 12/1980 |
| FR | 2603866 | 3/1988 |

(Continued)

OTHER PUBLICATIONS

French Search Report for FR 1301034, Completed by the French Patent Office on Dec. 13, 2013, 6 Pages.

*Primary Examiner* — Tien Dinh
*Assistant Examiner* — Aaron Rodziwicz
(74) *Attorney, Agent, or Firm* — Brooks Kushman P.C.

(57) ABSTRACT

A control system (20) for controlling pitching stabilizer means of an aircraft, said system (20) being provided with at least one outlet shaft (21) and with a first actuator (31) and a second actuator (36). The first and second actuators (31 and 36) are different, and the first actuator (31) is a slow actuator having a first driving portion that moves at a first speed, the second actuator (36) being a fast actuator having a second driving portion that moves at a second speed faster than the first speed, said control system (20) comprising a control device (50) connected to the first actuator (31) and to the second actuator (36) in order to cause said outlet shaft (21) to be driven either by the first driving portion (32) and/or by the second driving portion (37).

16 Claims, 2 Drawing Sheets

(56) References Cited

U.S. PATENT DOCUMENTS

| | | | |
|---|---|---|---|
| 4,834,319 A * | 5/1989 | Ewy | B64C 13/34 244/99.9 |
| 6,123,291 A * | 9/2000 | Dequin | B64C 13/16 244/17.13 |
| 6,461,265 B1 | 10/2002 | Graham et al. | |
| 6,694,230 B2 | 2/2004 | Kubica | |
| 9,205,911 B2 * | 12/2015 | Beroul | B64C 27/82 |
| 2009/0206197 A1 | 8/2009 | Degenholtz et al. | |

FOREIGN PATENT DOCUMENTS

| | | |
|---|---|---|
| FR | 2809372 | 11/2001 |
| GB | 657796 | 9/1951 |
| WO | 2008038037 | 4/2008 |

\* cited by examiner

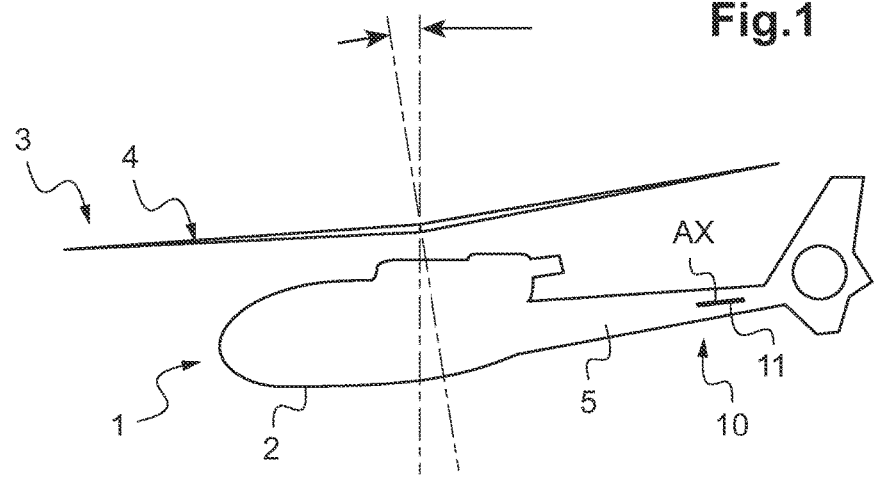
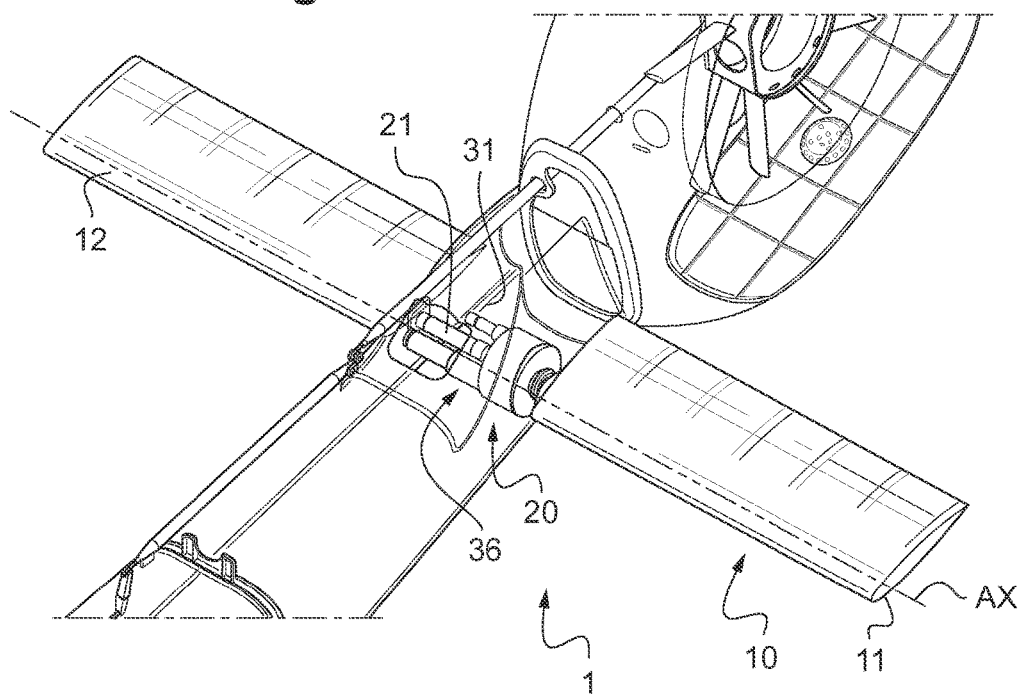

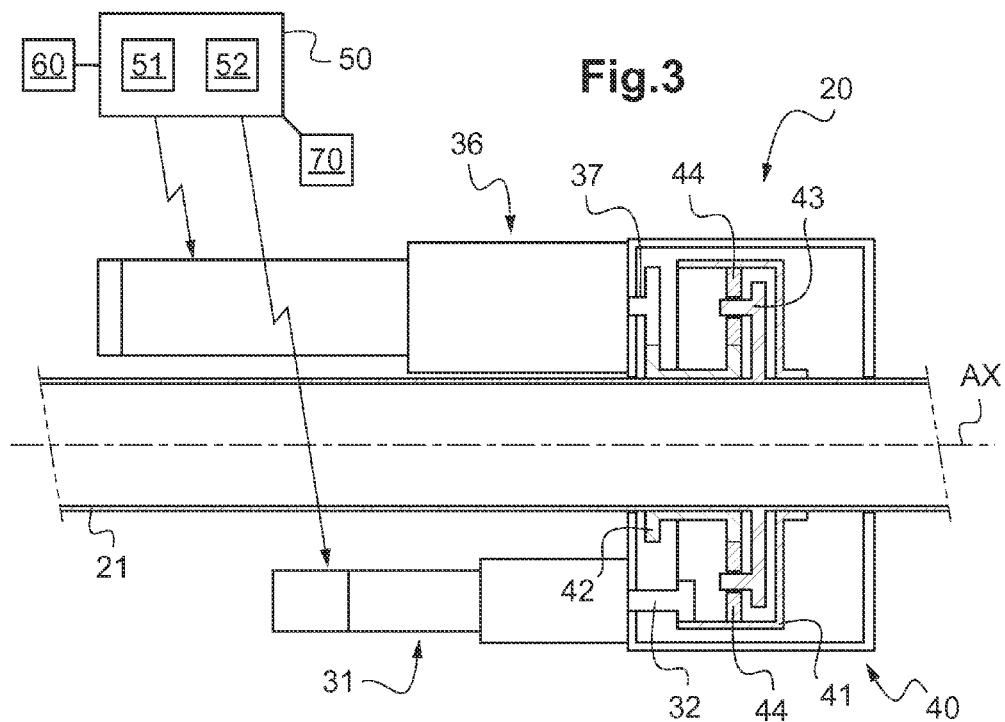
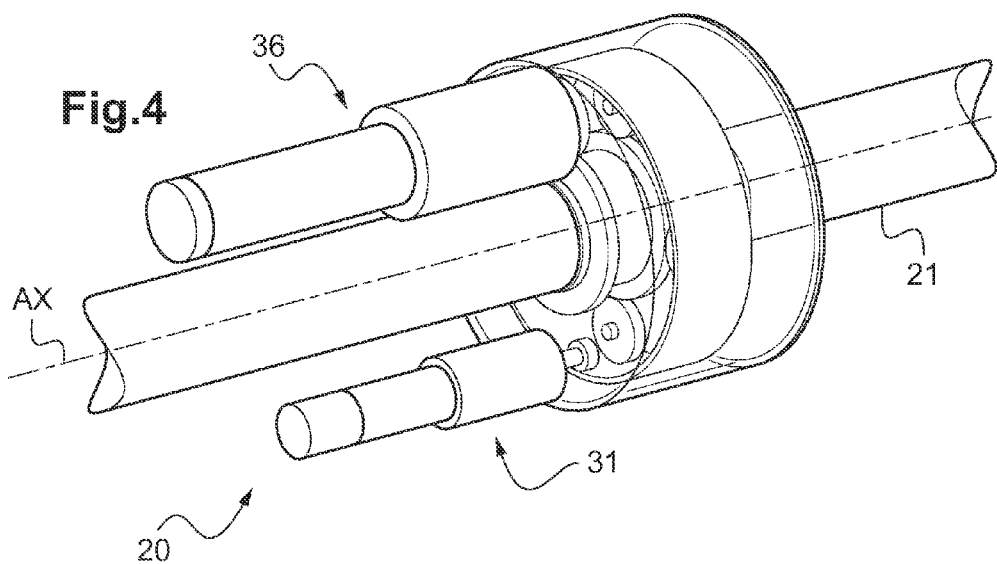
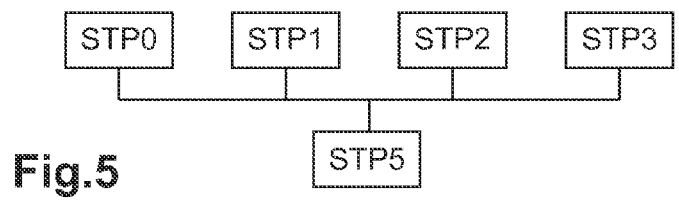

SYSTEM AND A METHOD FOR CONTROLLING PITCHING STABILIZER MEANS OF AN AIRCRAFT

CROSS REFERENCE TO RELATED APPLICATION

This application claims priority to French patent application No. FR 13 01034 filed on May 3, 2013, the disclosure of which is incorporated in its entirety by reference herein.

BACKGROUND OF THE INVENTION (1) Field of the Invention

The present invention relates to a system and to a method for controlling pitching stabilizer means, to a stabilizer assembly, and to an aircraft fitted with the system. More particularly, the invention lies in the narrow technical field of means for stabilizing rotorcraft in pitching.

(2) Description of Related Art

By way of example, a rotorcraft conventionally comprises a fuselage that extends longitudinally from a front end to a tail end on either side of an anteroposterior plane of symmetry, and extends in a vertical direction from a bottom portion fitted with landing gear to a top portion fitted with a rotary wing. The rotary wing may include a main rotor providing lift and propulsion.

A rotorcraft may also include a tail rotor at its tail end. The tail rotor serves in particular to counter the yaw torque exerted by the main rotor on the fuselage. The tail rotor also makes it possible to control yaw movements of the helicopter.

The rotary wing and the tail rotor can be controlled by flight controls connected by mechanical linkages to the rotary wing and/or to the tail rotor. Each mechanical linkage may be associated with an automatic control system including an actuator referred to as a "series" actuator and an actuator referred to as a "parallel" actuator or indeed as a "trim" actuator.

The series actuator is controlled by a computer to stabilize the aircraft. Such a series actuator has limited authority, possessing a stroke that does not enable it to cover the entire stroke of the associated flight control. Nevertheless, this limited authority remains sufficient to stabilize the aircraft about a required central position.

The series actuator is also a fast-moving actuator so as to enable the mechanical linkage to be adjusted quickly in order to stabilize the aircraft, e.g. following a gust of wind.

The series actuator is arranged in series in the mechanical linkage so as to be transparent for a pilot. In other words, the movements of a series actuator tend not to be felt by the pilot via the flight controls.

In contrast, the trim actuator can take the place of a pilot to act on the mechanical linkage over the full stroke of the associated flight control. Thus, a trim actuator has full authority over the movement of the mechanical linkage. A pilot can feel the action of the trim actuator. Since the trim actuator is arranged in parallel with the mechanical linkage, the trim actuator moves at least one flight control by means of the mechanical linkage on which the trim actuator acts.

A computer may then control the trim actuator to take the place of a pilot. Nevertheless, the computer may also call on the trim actuator to re-center the mechanical linkage as a function of movements requested by the series actuator, in particular when the series actuator reaches an abutment.

Conventionally, the trim actuator is a slow-moving actuator, as contrasted to the fast nature of the series actuator.

A rotorcraft sometimes also has additional stabilizer surfaces. For example, it is common practice to fit a rotorcraft with a stabilizer surface for stabilizing yaw movements.

Such a yaw movement stabilizer surface is generally referred to as a "fin".

Likewise, a rotorcraft sometimes has means for balancing and stabilizing pitching movements, referred to merely as "stabilizer means". Stabilizer means may present an angle of absolute value lying in the range 0 degree (°) plus or minus 90° relative to said anteroposterior plane. The pitching stabilizer means may optionally comprise two pitching stabilizer surfaces extending symmetrically on either side of an anteroposterior plane of symmetry of the rotorcraft and being orthogonal to the anteroposterior plane, or else possibly presenting a V-shape, for example.

Such stabilizer means for stabilizing pitching movements are sometimes referred to as a "horizontal stabilizer", or more simply merely as a "stabilizer". The term "stabilizer" is in widespread use since the stabilizer means are not necessarily horizontal. It is also possible to use the term "pitching stabilizer means".

A stabilizer may comprise at least one airfoil surface passing through the rear end of the aircraft in a transverse direction, or indeed at least one non-through airfoil surface extending transversely from said rear end on one side only of said anteroposterior plane.

In hovering flight, balancing the pitching moment of the rotorcraft relative to a fixed point involves two major components: the moment due to the weight of the aircraft and the moment due to the main propulsion and lift rotor, which, for a given weight of rotorcraft, is proportional to the angle of tilt of the main rotor relative to the vertical direction. Furthermore, variations in the position of the center of gravity of the helicopter give rise to variations in the attitude of the aircraft.

While the rotorcraft is in cruising flight, another component of the pitching moment is involved: the aerodynamic moment exerted by the airframe of the aircraft. As a result of varying the angle of incidence of the airframe relative to an upstream flow of air, the aerodynamic pitching moment tends to cause the aircraft to depart from its equilibrium position. This unstable component has the effect of increasing variations in the longitudinal attitude that are associated with the position of the center of gravity, as compared with the variations that are observed while hovering.

These variations of attitude have negative consequences. Excessive nose-down attitudes increase the aerodynamic drag of the rotorcraft, and consequently reduce its maximum speed. They also give rise to an impression of discomfort for the crew and for passengers. Excessive nose-up attitudes give rise to large moments on the mast and on the hub of the main rotor, with unfavorable consequences on the lifetimes of those elements.

The pitching stabilizer means located towards the rear of the aircraft seek to compensate instability in the pitching moment of the fuselage and to keep the attitude of the rotorcraft in equilibrium.

Stabilizer means are complex to design. In order to optimize the performance of an aircraft at high speed, the pitching stabilizer means are designed so as to obtain a longitudinal attitude that is close to a level attitude. Nevertheless, such a design can be penalizing for the operation of the main rotor, it being understood that it is more desirable to have a large nose-down attitude.

Furthermore, the design must be satisfactory for various configurations of weight, altitude, position of center of gravity, and possibly potential external aerodynamic configurations of the aircraft.

The effectiveness of the pitching stabilizer means may possibly be maximized by increasing wing area so as to reduce the effects of disturbances associated with variations in the weight and the position of the center of gravity of the rotorcraft.

Nevertheless, such a solution is limited, e.g. because of the "attitude hump" phenomenon known to the person skilled in the art, that results from interactions between the main rotor and the pitching stabilizer means. Furthermore, a large wing area tends to give rise to large variations in the attitude of the aircraft while the aircraft is climbing or descending.

Manufacturers have sought to remedy those drawbacks by creating a device for controlling pitching stabilizer means in such a manner as to balance a rotorcraft in pitching, while simultaneously keeping control over its performance and the loads applied to the hub of a main rotor, while being unaffected by variations in the position of the center of gravity, and while complying with the above-mentioned constraints needing the size of said airfoil surface to be limited.

Thus, Documents U.S. Pat. No. 2,424,882 and GB 657 796 provide for a lever that is mechanically connected to pitching stabilizer means in order to control the angle of incidence of the stabilizer means.

Those documents suggest manual piloting. Nevertheless, the complexity of modern rotorcraft can lead to the angle of incidence of the pitching stabilizer means being servo-controlled depending on flight conditions.

Document FR 2 456 663 provides for using an actuator device to servo-control the angle of incidence of a chord plane. That actuator device is provided with two motors to cause a rod to move in translation.

Certain aircraft make use of two electric actuators mounted back to back, one being fastened to the tail boom of said aircraft and the other being fastened to pitching stabilizer means.

Actuator redundancy makes it possible to operate the stabilizer in the event of one of the actuators failing.

The technological background remote from the invention also includes the following documents: FR 2 603 866, US 2009/0206197, FR 2 809 372, U.S. Pat. No. 4,834,319, WO 2008/038037, and U.S. Pat. No. 6,461,265.

Document FR 2 603 866 relates to a system for controlling airplane control surfaces in a context of so-called "fly-by-wire" assisted piloting associated with an auxiliary control that is mechanical.

It should be observed that the technical field of airplanes is remote from the technical field of rotorcraft. In particular, a rotorcraft responds to flight control orders much more quickly and strongly than does an airplane. Furthermore, an airplane possesses natural stability, as contrasted to the unstable nature of rotorcraft, which tends to require stability to be controlled continuously.

Document US 2009/0206197 describes two actuators connected to a flap, the two actuators being connected to each other.

Document FR 2 809 372 relates to an aircraft with electric flight controls provided with an actuator for moving a control surface.

Document U.S. Pat. No. 4,834,319 describes an actuator having a first motor with authority over a moving surface that is limited by an abutment, and a second motor for adjusting the margin of the first motor relative to the abutment.

BRIEF SUMMARY OF THE INVENTION

The present invention thus seeks to provide a novel control system for pitching stabilizer means that takes account of the variety of requirements during a given flight and that is better adapted than merely providing two motors for redundancy as is done in the prior art.

The invention thus provides a control system for controlling pitching stabilizer means of an aircraft, the system being provided with at least one outlet shaft for turning the stabilizer means, the system having a first actuator and a second actuator.

Nevertheless, the first actuator and the second actuator are different, the first actuator is a slow-moving actuator having a first driving portion that moves at a first speed, the second actuator being a fast-moving actuator having a second driving portion that moves at a second speed faster than the first speed, the control system comprising a control device connected to the first actuator and to the second actuator in order to cause the outlet shaft to be driven either by the first driving portion, or by the second driving portion, or else by both the first driving portion and the second driving portion.

The control system has a memory including:

a first relationship for electrically controlling the first actuator while limiting the authority of the first actuator to turning the outlet shaft over a small angular range; and a secondary relationship for electrically controlling the second actuator while giving the second actuator full authority for turning said outlet shaft over a large angular range.

By way of example, the second actuator may have 100% authority over a large angular range, while the first actuator has authority limited to a small angular range of about 25% of the large angular range.

Each relationship thus determines the angle of inclination to be reached by the stabilizer means and under what conditions. The term "relationship" covers at least a mathematical relationship as such, possibly associated with conditions of application, or indeed any means enabling the control device to issue an appropriate order to the appropriate actuator at any time. For example, a relationship may correspond to a data table providing the order to be issued as a function of at least one parameter and/or of at least one condition.

Furthermore, the term "electric command" is used to cover any non-mechanical order enabling a movement to be requested of an actuator, and thus covers an electric signal as such, and also a signal that may be electronic, electromagnetic, or optical, for example. Such signals are described as being "electric" in a broad sense conventionally used by the person skilled in the art.

The control system thus has two distinct actuators, with each actuator being capable on its own of tilting the pitching stabilizer means. The actuators may act simultaneously on the stabilizer means, or else they may act in alternation.

Unlike Document U.S. Pat. No. 4,834,319, the invention does not provide an actuator having a fast motor with authority adjusted mechanically by a slow motor, but provides a slow actuator with limited authority and a fast actuator with unlimited authority, each of which is capable of modifying the angle of incidence of the stabilizer means.

The actuators may be linear or rotary, electric, hydraulic, or indeed pneumatic, for example.

Under such circumstances, the control system may use two actuators that are designed to satisfy their respective functions exactly, namely a fast actuator and a slow actuator for the purposes respectively of obtaining fast movement and slow movement of the pitching stabilizer means.

The size and/or the weight and/or the cost of the system can be smaller in comparison with a system using two large motors redundantly, for example.

The Applicant draws a distinction between the requirements of hovering flight and the requirements of the rotorcraft in forward flight.

On the ground, the pitching stabilizer means may be placed horizontally. Thus, the risk of damaging the pitching stabilizer means as a result of objects on the ground being thrown up under drive from the wind created by the rotary wing is reduced.

During hovering flight that takes place away from the zone that gives rise to the ground effect, the pitching stabilizer means may be turned to the full in order to reach a maximum downward angle of inclination so as to avoid being caught in the wash coming from the rotary wing and so as to avoid giving rise to an excessive nose-up attitude of the aircraft. The pitching stabilizer means may then be inclined at an angle of about 70° relative to the horizontal, for example.

It should be recalled that the ground effect is a concept known to the person skilled in the art. This ground effect usually occurs between the ground and a height of the same order as the diameter of the main lift rotor of the aircraft.

During hovering flight that takes places in the zone in which the ground effect is generated, the kinetic energy communicated to the air by the main lift rotor is transformed into pressure energy except in a peripheral ring where air streams are deflected. Unfortunately, the pitching stabilizer means are usually located in such a ring. The pitching stabilizer means may then have an angle of inclination lying between the horizontal and the above maximum angle of inclination.

During these stages, the rotorcraft does not move forward. The torque required for operating the pitching stabilizer means is therefore not necessarily very great, since the pitching stabilizer means are then not being subjected to large aerodynamic forces.

In contrast, during forward flight, the pitching stabilizer means are placed in a substantially horizontal central position in order to limit the fuselage nose-down effect that increases the drag of the aircraft.

In order to go from one stage of flight to another, the second actuator is used to position the pitching stabilizer means at the required angle of inclination.

The transition stage between hovering flight and forward flight takes place over a short period. Since the second speed of the second driving portion of the second actuator is fast, the required angle of inclination can be reached at the end of this transition stage.

Furthermore, during each stage of flight, the first actuator can be used to adjust the position of the pitching stabilizer means about the required position in order to stabilize the aircraft. The authority of the first actuator can thus be limited compared with the maximum authority of the second actuator.

During forward flight, the pitching stabilizer means are moved by the second actuator into a predetermined position in order to limit the nose-down effect that increases the drag of the helicopter. Nevertheless, the first actuator controls the pitching stabilizer means over a restricted angular range about this predetermined position so as to govern the dynamic stabilization of the aircraft.

The first speed of the first driving portion of the first actuator during forward flight can be much slower than the second speed, insofar as the first actuator seeks more specifically to adjust the position of the pitching stabilizer means.

The first and second speeds may be linear movement speeds or they may be angular speeds, depending on the type of actuator used.

Furthermore, the first actuator develops torque at a lower level than the second actuator.

The control device may be a conventional computer communicating with sensors in order to determine which actuator to use and the angle of inclination that is to be reached. By way of example, the computer may comprise a processor and a non-volatile memory, the processor executing instructions present in the memory.

For example, the control device may be connected to a device for measuring the altitude of the rotorcraft and to a device for measuring the forward speed of the rotorcraft in order to determine the stage of flight. The control device may also be connected to a device for estimating the longitudinal attitude of the aircraft in order to seek to stabilize the aircraft in pitching by using the slow first actuator.

The control system of the invention is very remote from the series trim actuators that are used in mechanical control linkages. Furthermore, the control system operates in a manner contrary to the operation of those actuators by providing a fast second actuator with considerable authority and a slow first actuator with little authority, as contrasted with a fast actuator with little authority and a slow actuator with considerable authority.

Under such conditions, the system uses a first actuator that may be of small dimensions in order to present movement that is slow and a second actuator that may be of large dimensions in order to present movement that is fast. Compared with devices providing actuators of large dimensions that are provided redundantly for safety purposes, the invention enables the overall size of the system to be minimized.

The actuators may also be brushed-motor actuators, which are economically advantageous.

The actuators are also different, thereby requiring different control logic, and that can improve safety.

In addition, both of the actuators are used during a flight. The system therefore does not include an actuator that usually remains still in flight since it is reserved for the event of a failure. The invention thus makes it easier to monitor the actuators and the quality of their operation.

The first actuator is the actuator that is used the most in flight. Under such circumstances, the invention proposes using the smaller actuator for most of the time. The invention thus avoids using two "large" motors, presenting capacities that are greatly under-used for most of the time.

Finally, the actuators may be controlled electrically.

The invention thus presents several surprising advantages.

The system may also include one or more of the following additional characteristics.

The memory of the control system may include a degraded third relationship for controlling the first actuator while giving full authority to the first actuator in order to turn the outlet shaft over said large angular range in the event of the second actuator failing.

During normal operation, the control system thus gives limited authority to the first actuator by using the first relationship.

In contrast, if the second actuator fails, then the control system gives full authority to the first actuator to over the entire acceptable angular range.

The control system may also include an alert device for signaling failure of the second actuator to a pilot in order to enable the pilot to adapt piloting to the slow speed of the first actuator.

The memory of the control system may also include a degraded fourth relationship for use when the first actuator has failed in order to control the second actuator while giving the second actuator full authority over turning the outlet shaft over said large angular range in order to reach a predetermined position of the stabilizer means depending on the stage of flight, and in order to adjust the position of the stabilizer means dynamically about said predetermined position.

The second actuator then performs its specific function and also the function of the first actuator.

Consequently, the invention makes it possible to comply with safety recommendations even in the event of either actuator failing.

If the second actuator fails, the authority of the first actuator is increased so as to enable the stabilizer means to be moved over its entire range, but at limited speed (taking about one minute rather than about ten seconds, for example). It should be observed that it is also possible to envisage loading the first actuator exceptionally to its extreme limiting capacities in order to provide a better temporary replacement for the second actuator, providing appropriate maintenance action is then taken when repairing the failed second actuator.

If the first actuator fails, the second actuator is capable quite literally of replacing the failed actuator without the crew being affected during a flight, given that the second actuator is faster and more powerful than the first actuator.

Furthermore, the control system may include a differential device for connecting the first actuator and the second actuator to the outlet shaft.

The differential device may optionally comprise:
 a ring gear mechanically engaged with the first driving portion;
 a sun gear mechanically engaged with the second driving portion; and
 a planet carrier carrying a plurality of planet gears, each interposed between the sun gear and the ring gear, said planet carrier meshing with the outlet shaft.

The control system is then a simple system enabling the first actuator or the second actuator to be used.

Furthermore, the first actuator develops a first power and the second actuator develops a second power, the second power possibly being greater than the first power.

By way of example, the first actuator may develop outlet power of the order of 10 watts (W) in order to satisfy requirements, while the second actuator develops a second power of 100 W.

In addition to a control system, the invention provides a stabilizer assembly provided with pitching actuator means including at least one stabilizer surface.

The assembly is remarkable in particular in that it includes the above-described control system, which control system has an outlet shaft connected to each of the stabilizer surfaces in order to drive them to turn about an axis of rotation.

Furthermore, the invention provides an aircraft having a rotary wing and including such a stabilizer assembly.

The invention also provides a method of stabilizing such an aircraft, the method comprising the steps of quickly positioning the stabilizer means in a predetermined position depending on the stage of flight by using the second actuator, and operating the stabilizer means slowly for stabilizing the aircraft by dynamically adjusting the position of the stabilizer means about said predetermined position by using the first actuator.

The first speed of the first actuator may be designed to cause the stabilizer means to move at an angular speed lying in the range 0.1 degrees per second (°/s) to 2°/s, and the second speed of the second actuator is designed to cause the stabilizer means to move at an angular speed lying in the range 7°/s to 14°/s.

The second actuator is then fast enough to enable a pitching stabilizer means to be operated completely during a transition stage, the first actuator being fast enough to ensure that the aircraft is stable but without being overdimensioned.

The actuators make it possible to position the stabilizer means in a manner that is appropriate, e.g. for optimizing fuel consumption or indeed for reducing the forces exerted on the mast of a rotor of the aircraft.

Optionally, in the event of a failure of the second actuator, the stabilizer means are positioned in the predetermined position by using the first actuator, and an alert is generated.

Furthermore, the second actuator may be used to position the stabilizer means:
 in a first predetermined position when the aircraft is flying in a zone that is subjected to a ground effect;
 in a second predetermined position when the aircraft is not present in said zone and when it possesses a forward speed below a threshold; and
 in a third predetermined position when the aircraft is not present in said zone and when it possesses a forward speed greater than said threshold.

The first actuator then makes it possible to adjust the position of the stabilizer means about the appropriate predetermined position.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 is a diagrammatic view of an aircraft of the invention;

FIG. 2 is a view showing the pitching stabilizer assembly of the invention;

FIGS. 3 and 4 are views presenting the control system of the stabilizer assembly; and FIG. 5 is a diagram showing a method that can be applied by the invention.

DETAILED DESCRIPTION OF THE INVENTION

Elements present in more than one of the figures are given the same references in each of them.

FIG. 1 shows an aircraft 1 having a fuselage 2 carrying a rotary wing 3. By way of example, the aircraft 1 has a rotary wing 3 comprising a rotor 4 for providing lift and propulsion.

The aircraft 1 also has a pitching stabilizer assembly 5. This assembly 5 includes pitching stabilizer means comprising at least one stabilizer surface 11 extending transversely from the fuselage 2.

With reference to FIG. 2, the pitching stabilizer means 10 may comprise two stabilizer surfaces 11 and 12 extending on either side of the fuselage. Nevertheless, the stabilizer means could for example comprise a single stabilizer surface extending on one side only of the fuselage.

The stabilizer assembly 5 also has a control system 20 for controlling the aerodynamic angle of incidence of the stabilizer means. The system 20 serves to turn the stabilizer surfaces 11 and 12 about an axis of rotation AX.

The control system 20 includes an outlet shaft 21 connected to the stabilizer means 10, i.e. to each of the stabilizer surfaces 11 and 12. The system 20 also has a first actuator 31 and a second actuator 36 for turning the outlet shaft 21, and thus for turning the stabilizer means. Each actuator thus includes a movable driving portion capable of turning the outlet shaft 21.

The actuators may be electric motors with or without brushes, electric motors that generate linear movement, hydraulic actuators, pneumatic actuators, . . . .

The first actuator 31 and the second actuator 36 are different and they drive a body at different travel speeds and with different powers.

The first actuator 31 is a slow-moving actuator having a first driving portion moving in rotation or in translation at a first speed V1. In contrast, the second actuator 36 is a fast-moving actuator with a second driving portion 37 moving in rotation or in translation at a second speed V2 faster than the first speed V1.

For example, the first actuator 31 develops a first power P1 and the second actuator 36 develops a second power P2 greater than the first power P1.

In addition, the first speed V1 may be dimensioned so as to generate an angular speed of the stabilizer means lying in the range 0.1°/s to 2°/s, while the second speed V2 is dimensioned to give rise to an angular speed of the stabilizer means lying in the range 7°/s to 14°/s.

Under such circumstances, and in accordance with the method applied, the stabilizer means 10 are positioned quickly into a predetermined position depending on the stage of flight by using the second actuator 36. Thereafter, the stabilizer means 10 are operated slowly in order to stabilize the aircraft 1 by dynamically adjusting the position of the stabilizer means 10 about the predetermined position while using the first actuator 31.

For this purpose, and with reference to FIG. 3, the control system 20 includes a control device 50 connected to the first actuator 31 and to the second actuator 36 via wired or wireless connections (not shown).

The control device 50 may be connected to sensors in order to determine the stage of flight and the orders to be transmitted to the first actuator 31 and to the second actuator 36.

The control device 50 may include a member 51, e.g. a processor, for generating a control order for an actuator, and a member for determining the order that is to be given, such as a memory 52.

For example, the memory 52 stores a first relationship serving to determine a first order to be given to the first actuator 31 so as to request the pitching stabilizer means to turn over a small angular range. The memory 52 also stores a second relationship for determining a second order to be given to the second actuator 36 so as to request turning movement of the pitching stabilizer over a large angular range.

In other words, the first relationship gives limited authority to the first actuator, while the second relationship gives full authority to the second actuator.

Nevertheless, the memory 52 includes a degraded third relationship for controlling the first actuator 31 while conferring full authority to the first actuator 31. Optionally, the system 20 may include an alert system 70 connected to the control device in order to generate an alert in the event of a failure in the second actuator.

It should be observed that a failure of the second actuator may be detected by the usual methods.

A fourth relationship may be stored for controlling the second actuator in the event of a failure of the first actuator.

Furthermore, the control system 20 may include a differential device 40 for connecting the first actuator 31 and the second actuator 36 to the outlet shaft 21.

The different device 40 comprises a ring gear 41 meshing with the first driving portion 32 of the first actuator 31. A ball or roller bearing type device may be interposed between the ring gear and the outlet shaft 21, the ring gear and the outlet shaft being coaxial. A ball or roller bearing type device may also be interposed between the ring gear and a casing of the differential device.

Likewise, a sun gear 42 meshes with the second driving portion 37 of the second actuator 36. A ball or roller bearing type device may be interposed between the sun gear and the outlet shaft 21, the sun gear and the outlet shaft being coaxial.

Finally, a planet carrier 43 is constrained to rotate with the outlet shaft. For example, the planet carrier 43 meshes with the outlet shaft 21. The planet carrier 43 carries a plurality of planet gears 43, each interposed between the sun gear 42 and the ring gear 41.

Consequently, rotation of the first driving portion and/or of the second driving portion causes the planet carrier to turn and thus causes the outlet shaft to turn.

FIG. 4 is a three-dimensional view of the control system 20.

FIG. 5 explains a method that may be performed by the aircraft of the invention.

During an initial stage on the ground, STP0, the control device 50 generates an order for the second actuator to move the stabilizer means quickly into an initial position corresponding to a zero angle relative to the horizontal.

In contrast, when the aircraft 1 is present in a zone that is subjected to a ground effect, the aircraft is in a stage of flight referred to for convenience as the first stage of flight STP1.

This first stage of flight occurs in particular when the aircraft is taking off.

Consequently, when the aircraft is in this first stage of flight, the control device 50 generates an order for the second actuator to move the stabilizer means quickly into a first predetermined position. By way of example, the first predetermined position corresponds to lying at an angle of 30° relative to said initial position.

When the first predetermined position is reached, the control device 50 generates an order for the first actuator to move the stabilizer means slowly over a restricted range, if necessary, in order to keep the longitudinal attitude of the aircraft substantially constant.

When the aircraft 1 is not present in the zone that is subjected to the ground effect and when it possesses a forward speed that is slower than a threshold, the aircraft is in a stage of flight referred to for convenience as the second stage of flight STP2.

This second stage of flight occurs in particular when the aircraft is hovering away from the ground effect.

Consequently, when the aircraft is in this second stage of flight, the control device 50 generates an order for the second actuator to move the stabilizer means quickly into a second predetermined position. By way of example, the second predetermined position corresponds to an angle of 70° relative to said initial position.

When the second predetermined position is reached, the control device 50 generates an order for the first actuator to move the stabilizer means slowly over a restricted range, if necessary, in order to keep the longitudinal attitude of the aircraft substantially constant.

When the aircraft 1 is not present in the zone that is subjected to the ground effect and when it is traveling at a forward speed faster than the threshold, the aircraft is in a stage of flight referred to for convenience as the third stage of flight STP3.

This third stage of flight occurs in particular when the aircraft is flying forwards.

Thus, when the aircraft is in this third stage of flight, the control device 50 generates an order for the second actuator to move the stabilizer means quickly into a third predetermined position. By way of example, the third predetermined position may correspond to said initial position.

When the second predetermined position is reached, the control device 50 generates an order for the first actuator to move the stabilizer means slowly, if necessary, in order to keep the longitudinal attitude of the aircraft substantially constant. More precisely, the stabilizer means may be moved, by way of example, over a restricted range of plus or minus 10° about the third predetermined position.

Independently of the stage of flight, if the second actuator fails, the control device controls the first actuator in a degraded mode to take the place of the second actuator, where necessary. An alert may also be generated in parallel.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

For example, the actuators may be linear actuators connected to the outlet shaft by respective cams, so that a movement in translation of a driving portion of an actuator generates a movement in rotation of the outlet shaft.

What is claimed is:

1. A control system for controlling pitching stabilizer means of an aircraft, the system being provided with at least one outlet shaft for turning the stabilizer means, the system having a first actuator and a second actuator, the first and second actuators being different, wherein the first actuator has a first driving portion that moves at a first speed, the second actuator has a second driving portion that moves at a second speed greater than the first speed, the control system comprising a control device connected to the first actuator and to the second actuator in order to cause the outlet shaft to be driven either by the first driving portion or by the second driving portion, or else by both the first driving portion and the second driving portion, the control system including a memory having a first relationship for electrically controlling the first actuator while limiting the authority of the first actuator for turning the outlet shaft over a first angular range, and a secondary relationship for electrically controlling the second actuator while giving the second actuator full authority for turning the outlet shaft over a second angular range, the first angular range being less than the second angular range, wherein the control system includes a differential device for connecting the first actuator and the second actuator to the outlet shaft, wherein the differential device comprises:
a ring gear mechanically engaged with the first driving portion,
a sun gear mechanically engaged with the second driving portion, and
a planet carrier carrying a plurality of planet gears, each interposed between the sun gear and the ring gear, the planet carrier meshing with the outlet shaft.

2. A system according to claim 1, wherein the memory includes a third relationship for controlling the first actuator while giving full authority to the first actuator to turn the outlet shaft over the second angular range in the event of the second actuator failing.

3. A system according to claim 2, wherein the system includes an alert device for signaling failure of the second actuator to a pilot in order to enable the pilot to adapt piloting to the first speed of the first actuator.

4. A system according to claim 1, wherein the memory includes a fourth relationship for use when the first actuator has failed in order to control the second actuator while giving the second actuator full authority over turning the outlet shaft over the second angular range in order to reach a predetermined position of the stabilizer means depending on the stage of flight, and in order to adjust the position of the stabilizer means dynamically about the predetermined position.

5. A system according to claim 1, wherein the first actuator develops a first power output and the second actuator develops a second power output, the second power output being greater than the first power output.

6. A stabilizer assembly having pitching stabilizer means comprising at least one stabilizer surface, wherein the assembly includes a control system according to claim 1 having an outlet shaft connected to each stabilizer surface in order to turn each stabilizer surface about an axis of rotation.

7. An aircraft having a rotary wing, wherein the aircraft includes a stabilizer assembly according to claim 6.

8. A method of stabilizing an aircraft according to claim 7, the method comprising the steps of quickly positioning the stabilizer means in a predetermined position depending on the stage of flight by using the second actuator, and operating the stabilizer means slowly for stabilizing the aircraft by dynamically adjusting the position of the stabilizer means about the predetermined position by using the first actuator.

9. A method according to claim 8, wherein the first speed of the first actuator is designed to cause the stabilizer means to move at an angular speed lying in the range 0.1°/s to 2°/s, and the second speed of the second actuator is designed to cause the stabilizer means to move at an angular speed lying in the range 7°/s to 14°/s.

10. A method according to claim 8, wherein in the event of a failure of the second actuator, the stabilizer means is positioned in the predetermined position by using the first actuator, and an alert is generated.

11. A method according to claim 8, wherein the stabilizer means are positioned:
in a first predetermined position when the aircraft is flying in a zone that is subjected to a ground effect;
in a second predetermined position when the aircraft is not present in the zone and when the aircraft possesses a forward speed below a threshold; and in a third predetermined position when the aircraft is not present in the zone and when the aircraft possesses a forward speed greater than the threshold.

12. An aircraft comprising:
a stabilizer assembly having a pitch stabilizing surface connected to an outlet shaft, wherein rotation of the outlet shaft about an axis of rotation turns the pitch stabilization surface;
a first actuator having a first driving portion to move at a first speed, the first driving portion drivably connected to the outlet shaft;
a second actuator having a second driving portion to move at a second speed, the second speed being greater than the first speed, the second driving portion drivably connected to the outlet shaft;
a control device connected to the first and second actuators for controlling the first and second actuators to drive the outlet shaft, the control device (i) electrically controlling the first actuator to drive the outlet shaft over a first angular range by limiting the authority of the first actuator, and (ii) electrically controlling the second actuator to drive the outlet shaft over a second angular range while giving the second actuator full authority for turning the outlet shaft, wherein the first angular range is less than the second angular range; and
a differential device connecting the first and second actuators to the outlet shaft, the differential device having a ring gear, a sun gear, and a planet carrier;
wherein the ring gear is meshed with the first driving portion of the first actuator, and the ring gear is coaxial with the outlet shaft;
wherein the sun gear is meshed with the second driving portion of the second actuator, and the sun gear is coaxial with the outlet shaft; and
wherein the planet carrier is constrained to rotate with the outlet shaft, the planet carrier having a plurality of planet gears, each planet gear positioned between and meshed with the sun gear and the ring gear.

13. The aircraft of claim 12 wherein each planet gear rotates about an axis that is parallel with the axis of rotation of the outlet shaft.

14. A method of stabilizing an aircraft comprising:
electrically controlling a first actuator to drive an outlet shaft over a first angular range while limiting the authority of the first actuator to operate a stabilizer assembly slowly to stabilize the aircraft by dynamically adjusting a position of a pitch stabilizer surface about a predetermined position, the first actuator being controlled to move a first driving portion of the first actuator at a first speed to drive the outlet shaft, the outlet shaft being connected to the stabilizer assembly having the pitch stabilizer surface such that rotation of the outlet shaft about an axis of rotation turns the pitch stabilizer surface;
electrically controlling a second actuator to drive the outlet shaft over a second angular range while giving full authority to the second actuator to quickly position the pitch stabilizer surface in the predetermined position based on a stage of flight of the aircraft, the second actuator being controlled to move a second driving portion of the second actuator at a second speed to drive the outlet shaft;
in response to a failure event of the second actuator, electrically controlling the first actuator to drive the outlet shaft over the second angular range while giving full authority to the first actuator to operate the stabilizer assembly to position the pitch stabilizer surface in the predetermined position; and
in response to a failure event of the first actuator, electrically controlling the second actuator to drive the outlet shaft over the second angular range while giving full authority to the second actuator to operate the stabilizer assembly to dynamically adjust the position of the itch stabilizer surface about the redetermined position;
wherein the first speed of the first driving portion is less than the second speed of the second driving portion; and
wherein the first angular range is less than the second angular range.

15. The method of claim 14 wherein, in response to the aircraft being in a first stage of flight defined by the aircraft being between the ground and a height defined by a diameter of a main lift rotor of the aircraft, the second actuator is electrically controlled to move the pitch stabilizer surface to a first predetermined position, and upon the pitch stabilizer surface reaching the first predetermined position, electrically controlling the first actuator to move the pitch stabilizer surface to maintain a constant longitudinal attitude of the aircraft;
wherein, in response to the aircraft being in a second stage of flight defined by the aircraft being above the height and having a forward speed less than a threshold, the second actuator is electrically controlled to move the pitch stabilizer surface to a second predetermined position, and upon the pitch stabilizer surface reaching the second predetermined position, electrically controlling the first actuator to move the pitch stabilizer surface to maintain the constant longitudinal attitude of the aircraft; and
wherein, in response to the aircraft being in a third stage of flight defined by the aircraft being above the height and having a forward speed greater than the threshold, the second actuator is electrically controlled to move the pitch stabilizer surface to a third predetermined position, and upon the pitch stabilizer surface reaching the third predetermined position, electrically controlling the first actuator to move the pitch stabilizer surface to maintain the constant longitudinal attitude of the aircraft.

16. The method of claim 15 wherein, in response to the aircraft being in an initial stage on the ground, the second actuator is electrically controlled to move the pitch stabilizer surface to an initial position corresponding to a zero angle relative to horizontal;
wherein the first predetermined position of the pitch stabilizer surface lies between the initial position and the second predetermined position;
wherein the third predetermined position of the pitch stabilizer surface corresponds to the initial position; and
wherein the threshold is set such that the aircraft is hovering in the second stage of flight and is flying forward in the third stage of flight.

* * * * *